United States Patent [19]

Osumi et al.

[11] 4,347,082
[45] Aug. 31, 1982

[54] MISCHMETAL ALLOY FOR STORAGE OF HYDROGEN

[75] Inventors: Yasuaki Osumi, Minoo; Hiroshi Suzuki, Ikeda; Akihiko Kato, Matsubara; Masanori Nakane, Ibaragi, all of Japan

[73] Assignees: Agency of Industrial Science and Technology; Ministry of International Trade and Industry, both of Tokyo, Japan

[21] Appl. No.: 192,809

[22] Filed: Oct. 1, 1980

[30] Foreign Application Priority Data

Oct. 23, 1979 [JP] Japan .................................. 54-137489

[51] Int. Cl.³ ............................................ C22C 19/05

[52] U.S. Cl. ...................................... 75/171; 423/644
[58] Field of Search ..................... 75/171, 122, 134 F, 75/170, 134 C, 152; 423/644

[56] References Cited

U.S. PATENT DOCUMENTS 4,222,770  9/1980  Osumi et al. ............................. 75/171

Primary Examiner—R. Dean
Attorney, Agent, or Firm—Kurt Kelman

[57] ABSTRACT

A Mischmetal alloy of the general formula: $MmNi_{5-x}Cr_{x-y}A_y$, wherein Mm stands for Mischmetal and A for Al, Co, Cu, Fe, Mn or Si, is highly useful as an alloy for the storage of hydrogen by occlusion.

2 Claims, 1 Drawing Figure

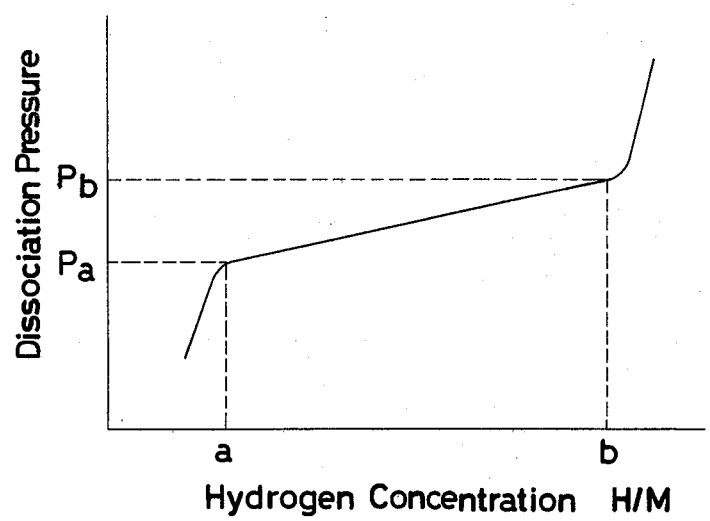

MISCHMETAL ALLOY FOR STORAGE OF HYDROGEN

BACKGROUND OF THE INVENTION

This invention relates to an alloy for the storage of hydrogen, and more particularly to a novel and useful Mischmetal type multi-element alloy for the storage of hydrogen, which is capable of occluding a large volume of hydrogen in the form of a hydride and releasing the hydrogen readily and rapidly by application of a small amount of heat.

As a new energy source to take the place of fossil fuels, hydrogen has recently come to attract increasing attention because of its salient advantage that it has promise of limitless supply, it is clean, it is transportable and its use as an energy source does not disturb natural cycles.

Heretofore, hydrogen has been stored in the form of gaseous hydrogen or liquefied hydrogen or metal hydride. Of the various forms of storage, the storage of hydrogen in the form of a metal hydride has recently come to attract particular attention in view of its safety and in due consideration of the fact that the metal hydride reversibly permits occlusion and release of hydrogen. The requirements which must be fulfilled by a substance to be used for storing hydrogen in the form of a metal hydride are (1) that the substance should be inexpensive and readily available, (2) that it should be readily activated and should possess a high capacity for occlusion of hydrogen, (3) that it should possess a moderate equilibrium dissociation pressure near room temperature, (4) that it should exhibit a constant dissociation pressure relative within a certain range of the hydrogen/metal atom ratio and (5) that the reactions of occlusion and release of hydrogen occur reversibly at a high rate of speed.

The transition metals such as Ti, Zr, La and Mg which have heretofore been known to produce hydrides have poor qualities for use as substances for storage of hydrogen because the hydrides of these metals are highly stable thermally and do not liberate hydrogen unless their temperatures are elevated to levels higher than 300° C., for example. In recent years, alloys of Ti-Ni, Ti-Co, Ti-Fe, La-Ni, Mg-Ni, Mm (Mischmetal)-Ni and Mm-Co have been developed. They, however, all have defects as substances for storage of hydrogen. Of the aforementioned alloys, those of Ti, La and Mg alloys are as thermally stable as the metals Ti, La and Mg and require a long time for effecting occlusion and release of hydrogen. The activation effected on these alloys can hardly be called easy. In the case that one of these alloys is used for the storage of hydrogen, the metals from which the alloy is produced must be of very high purity and, in this respect, there is an economic problem. Moreover since their capacities for occlusion of hydrogen are affected by the purity of hydrogen, the hydrogen subjected to occlusion by the alloys is required to possess a high purity.

Comparison of the Mm-Ni and Mm-Co alloys reveals that while the former alloy possesses a high equilibrium dissociation pressure despite a large capacity for hydrogen occlusion, the latter alloy suffers from a small capacity for hydrogen occlusion despite a low equilibrium dissociation pressure. The activation of the Mm-Ni type alloy requires the hydrogen pressure to be as high as 80 to 90 kg/cm² or the treatment of activation to be performed for an excessively long period or to be repeated a number of times. This alloy consumes much time in occluding or releasing hydrogen and suffers from the problem that the dissociation pressure is greatly affected within a certain range of hydrogen/metal atom ratio.

As an improvement over these alloys, there has been invented an alloy of the composition $MmNi_{5-x}Co_x$ (U.S. Pat. No. 4,147,536). This alloy approximates the Mm-Co alloy in equilibrium dissociation pressure and the Mm-Ni alloy in capacity for hydrogen occlusion. U.S. Application Ser. No. 18,941 (dated Mar. 31, 1978) U.S. Pat. No. 4,222,770 covers a still better alloy for the storage of hydrogen. This alloy is represented by the general formula $MmNi_{5-x}A_x$ (wherein, A is one member selected from the group consisting of B, Ca, Cr, Cu, Fe, V, Zn and Si). This alloy excels above all the alloys mentioned above in most properties indispensable to the storage of hydrogen such as, for example, speed of hydrogen occlusion, activation and equilibrium dissociation pressure. From the practical point of view, however, an alloy possessing much better properties is in demand.

SUMMARY OF THE INVENTION

An object of this invention is to provide an alloy possessing all properties necessary for the storage of hydrogen.

To accomplish the object described above according to the present invention, there is provided a Mischmetal type multi-element alloy substituting a specific metal for a prescribed proportion of the chromium component in the $MmNi_{5-x}Cr_x$ type alloy. Possessing all the properties indispensable to the storage of hydrogen, this alloy far excels the conventional alloys in usefulness for the purpose of hydrogen storage.

Specifically, this invention relates to a Mischmetal type multi-element alloy represented by the general formula:

$$MmNi_{5-x}Cr_{x-y}A_y$$

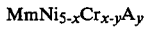

(wherein, Mm denotes Mischmetal, A denotes Al, Co, Cu, Fe, Mn or Si, x denotes a number having a value within the range of from 0.1 to 1, y denotes a number having a value within the range of from 0.01 to 0.99, provided that the number of x is greater than that of y), which alloy is capable of occluding hydrogen and therefore useful for storage of hydrogen.

BRIEF DESCRIPTION OF THE DRAWING

The drawing is a graph showing the pressure-composition isotherm for alloy-hydrogen systems.

DESCRIPTION OF THE PREFERRED EMBODIMENT

The aforementioned Mischmetal type multi-element alloy of the present invention is a novel alloy developed for the first time by the inventors and it fulfills all the aforementioned requirements indispensable to the storage of hydrogen. It enjoys the advantage that it is inexpensive and capable of being readily activated, occluding a large volume of hydrogen in a high density, providing a constant dissociation pressure in a wide range of hydrogen/metal atom ratio and enabling the occluded hydrogen to be readily and quickly released by application of a moderate heat at normal room temperature or to slightly higher temperatures (of the order of 30° to 35° C., for example). Moreover, the ability of the alloy of this invention to occlude hydrogen is not affected at all by the purity of the hydrogen subjected to the occlusion. The alloy, therefore, permits efficient occlusion of hydrogen containing oxygen, nitrogen, argon, carbon dioxide, etc. in certain volumes.

In addition, the alloy of this invention enjoys an advantage that since its quality is unimpaired by the repetition of the cycle of hydrogen occlusion-release treatments, it is allowed to retain its initial ability to occlude hydrogen for a long time.

The Mischmetal to be used in the alloy of this invention generally comprises 25 to 35% (by weight; the some for all percentages hereinafter) of lanthanum, 40 to 50% of cerium, 1 to 15% of praseodynium, 4 to 15% of neodymium and 1 to 7% of samarium+gadolinium and contains elements inevitably entrained by the raw materials. Generally, such entrained elements include 0.1 to 5% of iron, 0.1 to 1% of silicon, 0.1 to 2% of magnesium, 0.1 to 1% of aluminum, etc. Commercial products of Mischmetal are marketed today by Santoku Metal Industry, Shin-Nippon Metal Industry, Shinetsu Chemical Industry, for example.

As described above, the Mischmetal alloy of the present invention has a composition represented by the general formula:

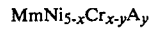
$$MmNi_{5-x}Cr_{x-y}A_y$$

(wherein, Mm denotes Mischmetal, A denotes Al, Co, Cu, Fe, Mn or Si, x denotes a number having a value within the range of from 0.1 to 1, y denotes a number having a value within the range of from 0.01 to 0.99, provided that the number of x is greater than that of y).

When the value of x is less than 0.1, the alloy exhibits properties approximating the properties of $MmNi_5$ and fails to manifest the effects of the incorporation of Cr and the metal component A (Al, Co, Cu, Fe, Mn or Si). Similarly to the alloy of $MmNi_5$ which involves a high dissociation pressure, the alloy of the aforementioned general formula wherein the value of x is less than 0.1 entails a disadvantage that the activation of the alloy necessitates application of high hydrogen pressure after thorough degasification, retention at low temperatures in an atmosphere of hydrogen, or the adoption of a combination of these two measures.

When the value of x is more than 1, although the alloy retains the merit of easy activation, it entails serious problems in that its ability to occlude hydrogen is greatly degraded and that it does not easily release the occluded hydrogen unless the alloy is subjected to application of heat to a high temperature, occasionally in conjunction with vacuumization of the ambience.

When the value of y is less than 0.01, the alloy barely possesses properties approximating the properties of $MmNi_{5-x}Cr_x$ and fails to manifest the effects of the incorporation of metal component A. Similarly to the alloy of $MmNi_{4.5}Cr_{0.5}$, for example, the alloy of the aforementioned general formula wherein the value of y is less than 0.01 suffers from a disadvantage that the dissociation pressure varies widely within a certain range of hydrogen/metal atom ratio and the speed of hydrogen release by the alloy is low.

For the manufacture of the Mischmetal type multielement alloy represented by the aforementioned general formula of the present invention, although any of the various known methods can be used, the arc melting method is preferably adopted. To be specific, this alloy is readily obtained by mixing Mischmetal, nickel, chromium and the A component in amounts required to give a composition represented by the aforementioned general formula, each in a powdered form or in some other suitable form (generally in the form of rods), compression molding the resultant mixture in a desired shape, placing the shaped mixture in a known arc melting furnace, thermally fusing the mixture under an inert atmosphere and allowing the fused mixture to cool off. The Mischmetal type multielement alloy of the present invention obtained as described above is generally used advantageously in a powdered form which offers the merit of an increased surface area. The advantageous particle size for the powdered alloy is within the range of from 100 to 200 mesh.

The alloy can very easily be activated and the activated alloy provides easy and quick occlusion and release of a large amount of hydrogen. The activation of the alloy is accomplished by subjecting this alloy to just one cycle of hydrogen occlusion and release operations, or to two cycles of such operations in the case of certain alloy compositions. The operation for the occlusion of hydrogen or the formation of a hydride is effected by packing a suitable container with the aforementioned powdered alloy, sealing hydrogen in the system at normal room temperature and applying to the system a hydrogen pressure of about 50 kg/cm$^2$.

Particularly the alloy of the present invention has an advantage that this operation of hydrogen occlusion can be accomplished at normal room temperature within a very short period of several minutes. In contrast, the known Ti-Fe alloy causes substantially no occlusion of hydrogen under application of hydrogen pressure of 50 kg/cm$^2$ at normal room temperature and, therefore, cannot be activated by means of hydrogen occlusion. With this alloy, the occlusion of hydrogen necessitates an elevation of temperature to the level of about 400° to 500° C. and the activation of alloy requires this operation of occlusion to be repeated a number of times. Similar conditions apply to the Ti-Ni and Mg-Ni alloys. For the Mm-Ni alloy to be activated under the conditions of 50 kg/cm$^2$ of hydrogen pressure at normal room temperature, a similar operation of hydrogen occlusion must be repeated a number of times on the alloy.

After the aforementioned operation of hydrogen occlusion is completed, the system is evacuated. Consequently, the occluded hydrogen is readily released and the activation of the alloy is brought to completion.

Storage of hydrogen in the alloy which has been activated as described above is effected by filling an airtightly sealable container such as, for example, an ordinary gas cylinder with the alloy and applying to the contained alloy a prescribed hydrogen pressure (a hydrogen pressure slightly higher than the dissociation pressure of the hydride of alloy in use) at a temperature within the range of from −30° C. to normal room temperature. Consequently, the alloy occludes a large amount of hydrogen in the form of a hydride in a short period of time. Release of hydrogen from the hydride can be effected by simply opening the container at normal room temperature. For more efficient, quicker release of hydrogen, the alloy with the occluded hydrogen is desired to be subjected to application of heat to a temperature higher than the normal room temperature or to vacuumization of the ambience, preferably to both the treatments. These operations of occlusion and release of hydrogen into and out of the activated alloy of the present invention can be carried out very easily compared with those involved in the case of the conventional alloys such as Ti-Fe, Ti-Ni, La-Ni, Mn-Ni and Ng-Ni alloys. Specifically, these operations can be performed efficiently more than four times as quickly as with these conventional alloys.

It further enjoys the following advantages even over the $MmNi_{5-x}Co_x$ alloy and the $MmNi_{5-x}A_x$ (A denoting B, Ca, Cr, Cu, Fe, V, Zn or Si) alloy.

The alloy of the present invention has a salient feature that the dissociation pressure is constant over a wide range of the hydrogen/metal atom ratios. Generally, the dissociation pressure-composition isotherm for the alloy-hydrogen system is represented as shown in FIG. 1. Let Pa and Pb stand for the dissociation pressures for the two hydrogen/metal atom ratios (H/M) a, b, and then the flatness factor of the pressure-composition isotherm is expressed by the ratio (Pb−Pa)/(b−a). A small value for this flatness factor means that the pressure at which hydrogen is released will vary only slightly over a wide range of hydrogen concentration. This is turn means that rapid and efficient release of occluded hydrogen can be obtained with only slight variation in concentration or pressure. From this it will be seen that the smaller the flatness factor of an alloy is, the more suitable the alloy is as a material for hydrogen storage. As shown in Table 1 of Example 1, the alloy of the present invention has a lower flatness factor than the $MmNi_{5-x}Cr_x$ alloy and the $MmNi_{2.5}Co_{2.5}$ alloy and, therefore, enjoys an outstanding characteristic that it releases the occluded hydrogen at a high rate of speed.

Further, the alloy of the present invention enables the aforementioned occlusion and release of hydrogen in a perfectly reversible manner. Substantially no degradation is observed to occur in the alloy itself no matter how often the formation of the hydride and the decomposition thereof may be repeated. This means that the alloy can be used for a very long period of time. The impurities such as oxygen, nitrogen, argon and carbon dioxide which are possibly present in the occluded hydrogen are observed to have substantially no effect upon the alloy. As described above, the alloy of the present invention is capable of occluding a large amount of hydrogen by an easy operation and permitting the occluded hydrogen to be readily and quickly released and, therefore, proves highly useful for the storage of hydrogen.

Now, the present invention will be described below specifically with reference to working examples.

EXAMPLE 1

Mm, Ni, Cr and A component in amounts of varying proportions as shown in Table 1 selected to satisfy the composition of the general formula, $MmNi_{5-x}Cr_{x-y}A_y$ (wherein, Mm denotes Mischmetal, A denotes Al, Co, Cu, Fe, Mn or Si, x denotes a number having a value within the range of from 0.1 to 1, y denotes a number having a value within the range of from 0.01 to 0.99, provided that the number of x is greater than that of y), each in the form of rods (5 mm in diameter and 5 mm in length) or a powder were mixed and the resultant mixture was compression molded into cylindrical tablets. These tablets were placed in a copper crucible of a high-vacuum arc melting furnace and, with the furnace interior displaced with an atmosphere of high-purity argon, melted at an elevated temperature of about 2000° C. and then left to cool off to afford an alloy of the composition shown in Table 1. The alloy thus obtained was pulverized to 120 mesh, and a 5.0-g specimen of the pulverized alloy was placed in a stainless steel reactor for occlusion and release of hydrogen and was activated as indicated below. The reactor was connected to an evacuation unit and subjected to a degasifying treatment at 200° C. under a vacuum. Subsequently at normal room temperature, hydrogen pure to 99.9999% was introduced into the reactor. When the hydrogen pressure within the reactor was kept at 50 kg/cm², the alloy was observed immediately to start occluding hydrogen. After the operation of hydrogen occlusion was completed, the reactor was again evacuated until the release of the occluded hydrogen was completed. The alloy which had been activated by one or two cycles of the aforementioned occlusion-release treatments was made to occlude hydrogen of purity of 99.9999% at a pressure slightly higher than the dissociation pressure of the hydride of the alloy at normal room temperature (20° C.) to effect sealed storage of hydrogen. The properties exhibited by the alloy of this invention for the storage of hydrogen, including the amount of hydrogen occluded, the dissociation pressure of the hydride of the alloy and the velocity of occlusion of hydrogen, etc. are shown in Table 1. For the purpose of comparison, Table 1 also shows similar properties exhibited by the known alloy $MmNi_5$ and the alloys shown in the U.S. Application Ser. No. 18,941 U.S. Pat. No. 4,222,770 prepared by following the procedure described above.

It is seen from Table 1 that the Mischmetal type alloy of the present invention, at room temperature, occluded hydrogen of an amount equal to or greater than the $MmNi_5$ (Specimen No. 1) alloy, attained activation with $\frac{1}{3}$ to 1/6 of the number of activation treatments required by the $MmNi_5$ alloy, and effected the occlusion of hydrogen at a speed four times as fast as the $MmNi_5$ alloy. The release of the hydrogen from the hydride of the alloy of this invention could easily be accomplished by leaving the reactor at normal temperature or heating it to a temperature slightly higher than the normal room temperature or by exposing the interior of the reactor to a vacuum or by subjecting the alloy to both the treatments. The speed at which the release of hydrogen occurred was as high as the speed at which the occlusion of hydrogen occurred.

TABLE 1

| Specimen No. | Alloy Composition $MmNi_{5-x}Cr_{x-y}A_y$ | Amount of hydrogen occluded (% by weight) | Dissociation pressure of hydride at 20° C. (in atmospheres) | Number of activation treatments | Speed of hydrogen occlusion (ml/g.min) | Speed of hydrogen release at 20° C. (in ml/g.min) | Flatness factor $\left(\frac{Pb - Pa}{b - a}\right)$ |
|---|---|---|---|---|---|---|---|
| 1 | $MmNi_5$ | 1.5 | 13.0 | 6 | 40 | 81 | 2.4 |
| 2 | $MmNi_{4.5}Cr_{0.45}Al_{0.05}$ | 1.6 | 3.0 | 1 | 165 | 245 | 0.2 |
| 3 | $MmNi_{4.5}Cr_{0.25}Al_{0.25}$ | 1.6 | 2.5 | 1 | 160 | 255 | 0.2 |
| 4 | $MmNi_{4.0}Cr_{0.5}Al_{0.5}$ | 1.5 | 4.3 | 1 | 160 | 240 | 0.3 |
| 5 | $MmNi_{4.0}Cr_{0.05}Al_{0.95}$ | 1.6 | 0.8 | 1 | 160 | 240 | 0.6 |
| 6 | $MmNi_{4.5}Cr_{0.45}Co_{0.05}$ | 1.6 | 3.0 | 1 | 165 | 240 | 0.2 |
| 7 | $MmNi_{4.5}Cr_{0.25}Co_{0.25}$ | 1.6 | 3.0 | 1 | 165 | 245 | 0.3 |
| 8 | $MmNi_{4.0}Cr_{0.5}Co_{0.5}$ | 1.5 | 4.5 | 1 | 160 | 245 | 0.4 |

TABLE 1-continued

| Specimen No. | Alloy Composition $MmNi_{5-x}Cr_{x-y}A_y$ | Amount of hydrogen occluded (% by weight) | Dissociation pressure of hydride at 20° C. (in atmospheres) | Number of activation treatments | Speed of hydrogen occlusion (ml/g.min) | Speed of hydrogen release at 20° C. (in ml/g.min) | Flatness factor $\left(\frac{Pb - Pa}{b - a}\right)$ |
|---|---|---|---|---|---|---|---|
| 9 | $MmNi_{4.0}Cr_{0.05}Co_{0.95}$ | 1.4 | 6.5 | 1 | 160 | 245 | 0.7 |
| 10 | $MmNi_{4.5}Cr_{0.45}Cu_{0.05}$ | 1.6 | 4.0 | 1 | 165 | 240 | 0.2 |
| 11 | $MmNi_{4.5}Cr_{0.25}Cu_{0.25}$ | 1.6 | 3.5 | 1 | 165 | 255 | 0.3 |
| 12 | $MmNi_{4.0}Cr_{0.5}Cu_{0.5}$ | 1.5 | 3.0 | 2 | 160 | 240 | 0.4 |
| 13 | $MmNi_{4.0}Cr_{0.05}Cu_{0.95}$ | 1.5 | 6.0 | 1 | 160 | 240 | 0.6 |
| 14 | $MmNi_{4.5}Cr_{0.45}Fe_{0.05}$ | 1.6 | 3.5 | 1 | 165 | 260 | 0.2 |
| 15 | $MmNi_{4.5}Cr_{0.25}Fe_{0.25}$ | 1.6 | 2.0 | 1 | 165 | 260 | 0.3 |
| 16 | $MmNi_{4.0}Cr_{0.5}Fe_{0.5}$ | 1.5 | 5.0 | 2 | 165 | 245 | 0.5 |
| 17 | $MmNi_{4.0}Cr_{0.05}Fe_{0.95}$ | 1.5 | 6.0 | 1 | 165 | 230 | 0.7 |
| 18 | $MmNi_{4.5}Cr_{0.45}Mn_{0.05}$ | 1.6 | 3.1 | 1 | 165 | 260 | 0.2 |
| 19 | $MmNi_{4.5}Cr_{0.25}Mn_{0.25}$ | 1.6 | 1.9 | 1 | 165 | 260 | 0.2 |
| 20 | $MmNi_{4.0}Cr_{0.5}Mn_{0.5}$ | 1.5 | 4.0 | 1 | 165 | 255 | 0.3 |
| 21 | $MmNi_{4.0}Cr_{0.05}Mn_{0.95}$ | 1.5 | 2.0 | 1 | 165 | 255 | 0.6 |
| 22 | $MmNi_{4.5}Cr_{0.45}Si_{0.05}$ | 1.6 | 3.0 | 1 | 165 | 260 | 0.2 |
| 23 | $MmNi_{4.5}Cr_{0.25}Si_{0.25}$ | 1.6 | 1.5 | 1 | 165 | 260 | 0.3 |
| 24 | $MmNi_{4.0}Cr_{0.5}Si_{0.5}$ | 1.5 | 3.0 | 1 | 160 | 260 | 0.4 |
| 25 | $MmNi_{4.0}Cr_{0.05}Si_{0.95}$ | 1.5 | 0.5 | 1 | 160 | 250 | 0.6 |
| 26 | $MmNi_{4.99}Cr_{0.01}$ | 1.6 | 12.0(30° C.) | 2 | 160 | 120 | 1.8 |
| 27 | $MmNi_{4.5}Cr_{0.5}$ | 1.6 | 5.0(30° C.) | 1 | 165 | 165 | 1.8 |
| 28 | $MmNi_{4.0}Cr_{1.0}$ | 1.5 | 4.6(30° C.) | 1 | 165 | 150 | 2.1 |
| 29 | $MmNi_{2.5}Co_{2.5}$ | 1.2 | 3.3 | 2 | 160 | 150 | 0.9 |

As is shown in Table 1, the hydrides of the Mischmetal type alloys according to the present invention showed proper values of dissociation pressure at 20° C., indicating that the alloys are especially suitable for the storage of hydrogen.

While the conventional Mischmetal-nickel type multi-element alloy and the alloys shown in the U.S. Application No. 18,941 U.S. Pat. No. 4,222,770 (Specimen No. 26-29) had the dissociation pressure of its hydride gradually increased with the increasing hydrogen/metal atom ratio, namely, the flatness factor is large the Mischmetal type multi-element alloy according to the present invention enjoyed an outstanding characteristic that the dissociation pressure of its hydride was constant over a wide range of hydrogen/metal atom ratios, namely, the flatness factor is small.

EXAMPLE 2

By following the procedure of Example 1, alloys of the compositions shown in Table 2 selected to satisfy the general formula, $MmNi_{5-x}Cr_{x-y}A_y$ (wherein, Mm denotes Mischmetal, A denotes Al, Co, Cu, Fe, Mn or Si, x denotes a number having a value within the range of from 0.1 to 1, y denotes a number having a value within the range of from 0.01 to 0.99, provided that the number of x is greater than that of y) were prepared and then activated by using hydrogen pure to 99.5%. The activation was accomplished by subjecting the alloy to one or two cycles of hydrogen occlusion and release treatments. In each of the alloys thus activated, hydrogen of purity of 99.5% was sealed in at room temperature (20° C.) under a pressure slighty higher than the dissociation pressure of the hydride of the allo to effect sealed storage of hydrogen. The properties exhibited by the alloy (same composition as Specimens 2-25 of Example 1) of this invention for the storage of hydrogen, including the amount of hydrogen occluded, the dissociation pressure of the hydride of the alloy, the speed of the occlusion of hydrogen, etc. were practically equal to those obtained for the alloy of Example 1. The release of hydrogen from the hydride was as easy and the speed of this release was as high as the hydride of Example 1. Part of the results obtained are shown in Table 2.

TABLE 2

| Specimen No. | Alloy Composition $MmNi_{5-x}Cr_{x-y}A_y$ | Amount of hydrogen occluded (% by weight) | Dissociation pressure of hydride at 20° C. (in atmospheres) | Number of activation treatments | Speed of hydrogen occlusion (ml/g.min) | Speed of hydrogen release at 20° C. (in ml/g.min) | Flatness factor $\left(\frac{Pb - Pa}{b - a}\right)$ |
|---|---|---|---|---|---|---|---|
| 1 | $MmNi_{4.5}Cr_{0.25}Al_{0.25}$ | 1.6 | 2.5 | 1 | 160 | 255 | 0.2 |
| 2 | $MmNi_{4.5}Cr_{0.25}Co_{0.25}$ | 1.6 | 3.0 | 1 | 165 | 245 | 0.3 |
| 3 | $MmNi_{4.5}Cr_{0.25}Cu_{0.25}$ | 1.6 | 3.5 | 1 | 165 | 255 | 0.3 |
| 4 | $MmNi_{4.5}Cr_{0.25}Fe_{0.25}$ | 1.6 | 2.0 | 1 | 165 | 260 | 0.3 |
| 5 | $MmNi_{4.5}Cr_{0.25}Mn_{0.25}$ | 1.6 | 1.9 | 1 | 165 | 260 | 0.2 |
| 6 | $MmNi_{4.5}Cr_{0.25}Si_{0.25}$ | 1.6 | 1.5 | 1 | 165 | 260 | 0.3 |
| 7 | $MmNi_{4.5}Cr_{0.5}$ | 1.6 | 5.0 (30° C.) | 1 | 165 | 165 | 1.8 |

EXAMPLE 3

The alloys of this invention obtained in Example 1 were activated with hydrogen of purity of 99.5% and subjected to 500 cycles of hydrogen occlusion and release treatments. Table 3 shows the amounts (weight %) of hydrogen occluded by some of the alloys after the indicated number of treatments. From this table, it is seen that the alloys' capacities for hydrogen occlusion were perfectly equal to those shown in Table 1.

This data shows that the alloy of the present invention suffers absolutely no decrease in the amount of hydrogen it is able to occlude even when it is subjected to as many as 500 cycles of hydrogen occlusion and release. In contrast, the known $MmNi_{4.5}Cr_{0.5}$ alloy becomes totally incapable of occluding any hydrogen at all after only 200 cycles of occlusion and release. Simply stated, this means that the alloy according to the present invention has very superior durability.

TABLE 3

| Specimen No. | Alloy Composition $MmNi_{5-x}Cr_{x-y}A_y$ | Number of treatments | | |
|---|---|---|---|---|
| | | 100 | 200 | 500 |
| 1 | $MmNi_{4.5}Cr_{0.25}Al_{0.25}$ | 1.6 | 1.6 | 1.6 |
| 2 | $MmNi_{4.5}Cr_{0.25}Mn_{0.25}$ | 1.6 | 1.6 | 1.6 |
| 3 | $MmNi_{4.5}Cr_{0.25}Si_{0.25}$ | 1.6 | 1.6 | 1.6 |
| 4 | $MmNi_{4.5}Cr_{0.5}$ | 1.6 | — | — |

What is claimed is:

1. A quaternary mischmetal alloy for storage of hydrogen, having a low flatness factor and represented by the general formula:

$$MmNi_{5-x}Cr_{x-y}A_y$$

wherein, Mm denotes Mischmetal, A is one member selected from the group consisting of Al, Co, Cu, Fe, Mn and Si, x denotes a number of a value within the range of from 0.1 to 1, y is a number of a value within the range of from 0.01 to 0.99, provided that the value of x is greater than that of y.

2. The Mischmetal alloy for storage of hydrogen according to claim 1, wherein the Mischmetal comprises 25 to 35% by weight of lanthanum, 40 to 50% by weight of cerium, 1 to 15% by weight of praseodymium, 4 to 15% by weight of neodymium, 1 to 7% by weight of samarium+gadolinium and the balance to make up 100% by weight of elements entrained by the raw materials used.

* * * * *